(12) United States Patent
Schad et al.

(10) Patent No.: US 9,242,402 B2
(45) Date of Patent: Jan. 26, 2016

(54) INJECTION MOLDING MACHINE WITH INTEGRATED PART HANDLING APPARATUS

(71) Applicant: ATHENA AUTOMATION LTD., Vaughan (CA)

(72) Inventors: Robert D. Schad, Toronto (CA); Carsten Link, Burlington (CA); Yanghuan Chen, Kitchener (CA)

(73) Assignee: ATHENA AUTOMATION LTD., Vaughan (CA)

(*) Notice: Subject to any disclaimer, the term of this patent is extended or adjusted under 35 U.S.C. 154(b) by 0 days.

(21) Appl. No.: 14/521,135

(22) Filed: Oct. 22, 2014

(65) Prior Publication Data

US 2015/0158225 A1 Jun. 11, 2015

Related U.S. Application Data

(63) Continuation of application No. 13/638,331, filed as application No. PCT/CA2011/000358 on Apr. 1, 2011, now Pat. No. 8,876,522.

(60) Provisional application No. 61/320,020, filed on Apr. 1, 2010.

(51) Int. Cl.
*B29C 45/42* (2006.01)
*B29C 45/14* (2006.01)

(52) U.S. Cl.
CPC ........... *B29C 45/42* (2013.01); *B29C 45/14008* (2013.01); *B29C 2045/4266* (2013.01)

(58) Field of Classification Search
CPC .............. B29C 45/14008; B29C 45/42; B29C 2045/4266
See application file for complete search history.

(56) References Cited

U.S. PATENT DOCUMENTS

| | | | | |
|---|---|---|---|---|
| 4,534,006 | A | * | 8/1985 | Minucciani et al. .......... 700/249 |
| 4,732,554 | A | | 3/1988 | Hellmann |
| 4,781,571 | A | | 11/1988 | Heindl et al. |
| 4,787,841 | A | | 11/1988 | Simon |
| 4,795,124 | A | * | 1/1989 | Nagai .......................... 249/66.1 |
| 7,104,780 | B2 | | 9/2006 | Domodossola et al. |
| 7,250,130 | B2 | | 7/2007 | Weinmann et al. |

FOREIGN PATENT DOCUMENTS

| | | |
|---|---|---|
| AT | 507257 | 3/2010 |
| JP | 63-82528 | 5/1985 |
| JP | 62264918 | 11/1987 |
| JP | 03-114645 | 5/1991 |
| JP | H10-305460 | 11/1998 |
| JP | 2003-225907 | 8/2003 |
| JP | 2003300232 | 10/2003 |

* cited by examiner

*Primary Examiner* — Jill Heitbrink
(74) *Attorney, Agent, or Firm* — Bereskin & Parr LLP/S.E.N.C.R.L., s.r.l.

(57) ABSTRACT

An injection molding machine includes a machine base supporting a first platen and at least a second platen for supporting respective mold sections, and a part handling apparatus for manipulating parts associated with molded part production. The part handling apparatus includes an upright supporting an end-of-arm tooling and an adjustable mount adjustably coupling the upright to the machine base. The adjustable mount includes at least a first linear rail extending parallel to the machine axis and structurally integrated with, and fixed relative to, the machine base at an elevation below an uppermost extent of the platens. The adjustable mount further includes a carriage fixed to the upright, the carriage adjustably coupled to the first rail.

11 Claims, 9 Drawing Sheets

INJECTION MOLDING MACHINE WITH INTEGRATED PART HANDLING APPARATUS

CROSS REFERENCES TO RELATED APPLICATIONS

This application is a continuation of U.S. patent application Ser. No. 13/638,331, filed on Nov. 8, 2012, which is a national phase entry of PCT Application Serial No. PCT/CA2011/000358, filed on Apr. 1, 2011, which claims priority from U.S. Provisional Patent Application Ser. No. 61/320,020, filed on Apr. 1, 2010, which are hereby incorporated herein by reference.

FIELD

The disclosure relates to injection molding machines, part handling automation of injection molding machines, and methods and apparatuses for manipulating parts relative to the mold of an injection molding machine.

BACKGROUND

U.S. Pat. No. 4,781,571 (Heindl et al.) purports to disclose an injection molding machine (1) that is equipped with an apparatus (7) for removing injection molded articles. The apparatus makes possible the removal of the articles (6) from the opened injection mold (3). A two-way support (10, 11, 12, 13) is moveably mounted on a guide bed (8) aligned parallel relative to the direction of actuation of the closing unit (2) for the injection mold (3). The two-way support has a vertically moveable carriage (13) with a support member (14) which at its lower end is provided with a gripping member (15) which is adjustable relative to the support member (14) about two longitudinal axes extending at a right angle relative to each other. The articles (6) can be removed from the opened injection mold (3) by means of the gripping member (15) and can be deposited as desired onto a device (16) either in front of the front end face or behind the rear face of the injection molding machine (1).

U.S. Pat. No. 4,732,554 (Hellman) purports to disclose an apparatus for removing injection molded articles from an opened injection mold of an injection molding machine. The apparatus has a low structural weight and provides exact control of the movements of a grasping member for grasping the injection molded articles. The apparatus has a guide bed and a carriage movably mounted on the guide bed. The guide bed is aligned parallel to the direction of operation of the closing unit of the injection mold. The carriage includes a cantilever which extends transversely of the guide bed. The cantilever carries a slide member longitudinally movable on the cantilever. An adjustable support member is mounted on the slide member. The grasping member is mounted at the lower end of the support member. The grasping member is adjustable relative to the support member about at least two joints extending perpendicularly to each other. In addition to the drive for the carriage and the drive for the support member, the drive for the support member is also mounted on the carriage above the guide bed. Accordingly, the weight of the drive for the support member does not rest on the cantilever, the slide member and the support member.

U.S. Pat. No. 4,787,841 (Simon) purports to disclose an apparatus for removing the sprue from an injection mold, having a cylinder and an associated piston rod, in which the piston rod extends between the two halves of the mold into the runner when the injection mold is closed. Molding material is molded around the forward end of the piston rod during the injection. Upon opening of the mold the sprue fixedly carried by the forward end is removed by movement of the piston rod into the cylinder.

SUMMARY

The following summary is intended to introduce the reader to various aspects of the applicant's teaching, but not to define any invention. In general, disclosed herein are one or more methods or apparatuses related to injection molding, and to moving parts into and/or out of a mold of an injection molding machine, and/or handling parts for pre-molding and/or post-molding operations. For example, in some applications print decals can be placed in the mold prior to closing the mold for an injection cycle. In some applications partially cooled and/or partially solidified parts can be removed from a mold and transferred to a post-mold cooling station. In some examples, one molded part can be removed from a mold and assembled to another molded part and/or to one or more parts fed to an assembly station.

According to some examples, a part handling apparatus is provided in the form of a cartesian or linear robot, mountable directly to the base of an injection molding machine. The part handling apparatus can include a first linear actuator for moving an end effector (or end-of-arm-tooling) between an advanced position in which the end effector reaches between two platens of an injection molding machine, and a retracted position in which the end effector is clear of the space between the two platens.

The first actuator can be mounted to an upright that is mounted to the base of the injection molding machine, at an elevation generally below that of the platens. The position of the upright relative to the base can be adjustable, and can be adjusted along a second linear axis. The second linear axis can be generally orthogonal to the first linear axis. Movement of the upright along the second axis can be effected manually, for example by pushing the upright into the desired position along the second axis and then moving a locking member from a released position into a locked position. In some examples, the part handling apparatus can include a second linear actuator for moving the upright along the second axis.

The upright can extend along a third linear axis, and the position of the first actuator relative to the base can be adjustable along the third linear axis. Movement of the first actuator relative to the base along the third linear axis can be effected manually or can be effected via a third linear actuator. In some examples, the apparatus can include a third linear actuator (for movement along the third axis) without a second linear actuator.

The apparatus can include one or more rotary actuators for rotating the end-of-arm-tooling about one or more rotary axes. The one or more rotary axes can be generally parallel to the first, second, or third linear axes. In some examples, the apparatus includes a rotary actuator mounted between the end-of-arm-tooling and the first actuator for rotating the end-of-arm-tooling about a rotary axis that is generally parallel to the first linear axis.

According to some aspects of the applicant's teaching, an injection molding machine comprises a machine base having a top surface; a pair of platens supported on the top surface of the machine base, at least one of the platens translatable along a machine axis between open and closed positions; an end-of-arm-tooling moveable relative to the machine base between an advanced position and a retracted position for interacting with parts associated with production in the injection molding machine; and an upright having a lower end adjustably coupled to the machine base and an upper end spaced apart from the top surface of the machine base and coupled to the end-of-arm-tooling.

The lower end of the upright may be disposed at an elevation generally below the top surface of the machine base. The upper end of the upright may be disposed at an elevation generally above the top surface of the machine base. The position of the upright relative to the machine base may be adjustable in at least one of a first and second linear adjustment direction, the first and second linear adjustment directions oriented, respectively, generally parallel to and perpendicular to the machine axis.

The machine may further comprise an adjustable mount adjustably coupling the lower end of the upright to the machine base. The adjustable mount may include a static mount portion structurally integrated with the machine base and a dynamic mount portion fixed to the lower end of the upright, the dynamic mount portion adjustably coupled to the static mount portion. The static mount portion may comprise a linear slide, and the dynamic mount portion may comprise a carriage slidably coupled to the linear slide. The linear slide may comprise at least a first rail fixed to the base, the first rail extending parallel to the machine axis. The linear slide may further comprise a second rail fixed to the base and extending parallel to the first rail, the second rail vertically spaced apart from the first rail by a vertical rail offset. The machine may include an upper tie bar and a lower tie bar each extending generally parallel to the machine axis and between the platens for exerting a clamping load across the platens, the upper and lower tie bars spaced vertically apart by a vertical tie bar spacing, and the vertical rail offset may be at least about 25 percent of the vertical tie bar spacing. The vertical rail offset may, in some examples, be at least about 75 percent of the vertical tie bar spacing.

The first rail may be positioned vertically above the second rail and vertically below the lower tie bar. The first rail may be positioned vertically above the second rail and at approximately the same elevation as the lower tie bar. The first rail and the second rail may be generally positioned in a common vertical plane, or one rail may be laterally offset relative to the other rail. The machine base may comprise a generally planar sidewall, and the first rail may be fixed to the sidewall. The second rail may be fixed to the sidewall of the machine base.

The position of the upright relative to the linear slide may be releasably lockable. The machine may further comprise an actuating arm supported by the upright, the end-of-arm-tooling coupled to the upright via the actuating arm. The actuating arm may comprises a static arm portion and a dynamic arm portion, and the dynamic arm portion may be moveable relative to the static arm portion along an arm axis between the advanced and retracted positions. The static portion may be fixed to the upright. The arm axis may be generally horizontal. The arm axis may be generally perpendicular to the machine axis.

According to some aspects, an injection molding machine comprises a machine base supporting an injection mold, the mold including mold portions mounted to a pair of platens supported on the machine base, at least one of the platens translatable along a machine axis between open and closed positions; and a part handling apparatus for manipulating parts associated with molded part production, the part handling apparatus movably supported on a first linear slide, the first linear slide built into the machine base.

The first linear slide may be positioned at an elevation below an uppermost extent of the platens. The first linear slide may be positioned at an elevation below a lowermost extent of the platens. The first linear slide may comprise a first rail. The first linear slide may comprise a second rail parallel to the first rail.

The machine may further comprise a manipulator moveable between an advanced position and a retracted position, the manipulator reaching between the platens when in the advanced position and being clear of the platens when in the retracted position. The machine may further comprise an upright supporting the manipulator above the machine base, the upright having a lower end mounted to the machine base. The first and second rails may be disposed laterally intermediate the upright and the machine base. The machine base may comprise a back sidewall disposed in a generally vertical plane at a non-operator side of the machine, and the upright may comprise a proximal surface facing the back sidewall, at least one of the first and second rails disposed between the proximal surface and the back sidewall.

According to some aspects, an injection molding machine and a part handling apparatus for interacting with the machine are provided in combination, the injection molding machine comprising: a base and a pair of platens supported on the base, at least one of the platens slidable along a machine axis between open and closed positions; the part handling apparatus comprising: a manipulator moveable between an advanced position and a retracted position, the manipulator reaching between the platens when in the advanced position and being clear of the platens when in the retracted position; and a first linear support; and an upright supporting the manipulator above the base, the upright having a lower end mounted to the base.

The part handling apparatus may include a first linear support coupled to the base, and an upright supporting the manipulator above the base, the upright having a lower end mounted to the base.

The base may have a sidewall with an outer sidewall surface, and the first linear support may include at least one rail mounted to the outer sidewall surface. The part handling apparatus may further include a first actuator for moving the upright along the first linear support. The first actuator may include a ball screw attached to the base and a rotary drive for rotating the ball screw.

The sidewall may have at least one recess extending laterally inwardly of the outer surface, at least a portion of the first actuator may be disposed within the recess. The recess may have a back wall generally parallel to the outer surface of the sidewall and spaced laterally inwardly therefrom, and the rotary drive may include a motor mounted to the back wall of the recess.

The recess may have a recess axial extent parallel to the machine axis 419 and the ball screw may have a ball screw length that is less than recess axial extent. The motor may be in-line with the ball screw, and the motor may have an axial length that together with the ball screw length defines an actuator axial extent. The recess axial extent may be greater than the actuator axial extent.

The part handling apparatus 430 may further include a carriage having a carriage body, and at least one bearing block may be fixed to the carriage body and be slidably engaged with the rail. The upright may be coupled to the carriage body. The carriage body may have a proximal surface facing the recess and the actuator may include a ball nut fixed to the proximal surface of carriage body, the ball nut protruding at least partially into the recess. The ball nut may have a lateral ball nut width, and at least about half the ball nut width may extend into the recess.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
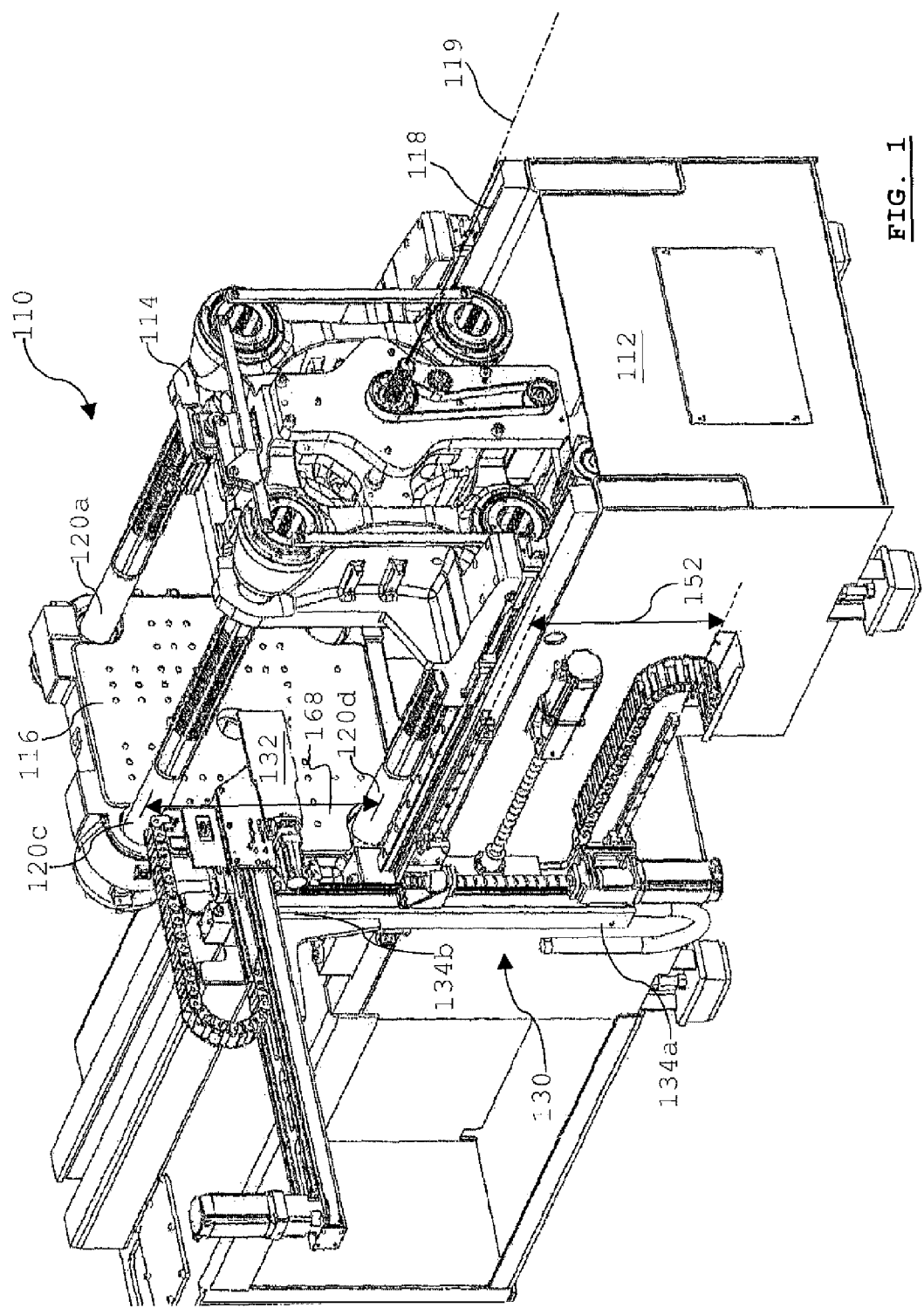
FIG. 1 is a perspective view of an injection molding machine with a part handling apparatus.

Referring to FIG. 1, an injection molding machine 110 comprises a machine base 112 for supporting an injection mold. The mold is formed at least in part by a first mold portion mounted to a first platen 114, and a second mold portion mounted to a second platen 116. In the example illustrated, the machine base 112 has a top surface 118, and the platens are supported on the top surface 118 of the machine base 112. At least one of the platens 114, 116 is translatable along a machine axis 119 between open and closed positions. In the example illustrated, the first platen is translatable relative to the machine base and is also referred to as moving platen 114, and the second platen 116 is stationary relative to the base (when in use) and is also referred to as stationary platen 116.

The injection molding machine 110 can include a plurality of tie bars for clamping together the platens 114, 116 when in the closed position. In the example illustrated, the machine 110 is provided with four tie bars, including an upper front tie bar 120a and a lower front tie bar 120b each positioned at the operator side of the machine 110, and an upper back tie bar 120c and a lower back tie bar 120d each positioned at the non-operator side of the machine 110.

The injection molding machine 110 includes a part handling apparatus 130 for manipulating parts associated with molded part production. The part handling apparatus 130 may, for example, be used to load parts into the mold prior to an injection molding cycle, such parts including, for example, printed films or decals to provide text or other images on parts produced in the mold. The part handling apparatus 130 may additionally or alternatively be used to unload parts from the mold after an injection molding cycle. Additionally or alternatively, the part handling apparatus 130 may facilitate performing post-mold operations such as, for example, post-mold cooling, and/or assembly of first parts from the mold with other articles, some of which may include second parts from the mold. In some examples, the machine 110 may comprise more than one mold between the platens 114, 116 and the part handling apparatus 130 may manipulate parts associated with both molds, such as, for example, removing parts from a first mold and inserting them into a second mold for sequential mold processing.

The part handling apparatus 130 generally comprises an end-effector (also called an end-of-arm-tooling or EOAT) 132 movable between an advanced and a retracted position for interacting with the parts. Such interacting of the EOAT 132 with the parts may include, for example, approaching the parts, at least partially surrounding the parts, inserting into the parts, and/or contacting the parts. The EOAT 132 can include air jets or suction members to direct air towards or from surfaces of the parts to facilitate, for example, cooling and/or to apply a force to the parts for gripping or ejecting the parts. In the example illustrated, when in the advanced position, the EOAT reaches between the platens to insert articles into, and/or retract articles from, the mold when the mold is open (i.e. when the moving platen is in the open position). When in the retracted position, the EOAT is clear of the platens so as to avoid interference with the mold when moving to the closed position.

The part handling apparatus 130 may, according to some aspects of the applicant's teaching disclosed herein, be structurally integrated with the machine base 112 for supporting the part handling apparatus 130 adjacent the platens 114, 116 and above a ground surface on which the machine is positioned. The part handling apparatus 130 may be generally free of any independent support (i.e. any support member separate or separable from the machine base 112) extending between the part handling apparatus 130 and a ground surface above which the part handling apparatus 130 may be positioned. The part handling apparatus 130 may be free of any weight-bearing connection between the part handling apparatus 130 and the stationary platen 116, and/or between the part handling apparatus 130 and the moving platen 114. In the example illustrated, generally all of the weight of the part handling apparatus (and its payload) is borne by the machine base 112. In some examples, the part handling apparatus 130 may be configured as a side entry robot in which substantially the entire weight of the part handling apparatus is borne by the machine base 112.

The part handling apparatus 130 may include an upright 134 having a lower end 134a adjustably coupled to the machine base 112 and an upper end 134b spaced apart from the top surface 118 of the machine base 112 and coupled to the EOAT 132. In the example illustrated, the lower end 134a of the upright 134 is disposed at an elevation generally below the top surface 118 of the machine base 112, and the upper end 134b of the upright 134 is disposed at an elevation generally above the top surface 118 of the machine base 112. The upright 134 may, for example, include one or more elongate structural members, tubular members, angle members, and/or gusset plates or other reinforcements. The lower end 134a of the upright 134 may generally correspond to a substructure that is disposed at an elevation generally below the top surface 118 of the machine base 112 when the EOAT 132 is in or moving between the advanced and retracted positions. The upper end 134b of the upright 134 may for example generally correspond to a superstructure disposed at an elevation generally greater than the top surface 118 of the machine base 112 when the EOAT 132 is in or between the advanced and retracted positions.

The position of the upright 134 relative to the base 112 may be adjustable in at least one of a first and second linear adjustment direction 136, 138. The first and second linear adjustment directions 136, 138 may be oriented, respectively, generally parallel to, and generally perpendicular to, the machine axis 119. In the example illustrated, the position of the upright 134 relative to the machine base 112 is adjustable in a first linear adjustment direction 136 that is generally horizontal and generally parallel to the machine axis 119, and in an optional second linear adjustment direction 138 that is generally vertical.

The part handling apparatus 130 may include an adjustable mount 140 for securing the upright 134 to the machine base 112. The adjustable mount 140 may include a static mount portion 142 structurally integrated with the machine base 112, and a dynamic mount portion 144 fixed to the upright 134 and coupled to the static mount portion 142. The structural integration of the static mount portion 142 with the machine base 112 may comprise configuring and/or securing the static mount portion 142 relative to the machine base 112 such that the static mount portion is configured to bear the entire weight of the part handling apparatus. At least in some examples, the structural integration of the static mount portion 142 with the machine base 112 may provide that generally the entire weight of the part handling apparatus 130 is transferred to the machine base 112 via the adjustable mount 140. The dynamic mount portion 144 may be fixed to the lower end 134a of the upright 134. The position of the dynamic mount portion 144 relative to the static mount portion 142 may be adjustable.

In the example illustrated, the static mount portion 142 comprises a linear slide 146, and the dynamic mount portion 144 comprises a carriage 148 slidably coupled to the linear slide 146. The linear slide 146 may be positioned at an elevation below an uppermost extent of the platens, and/or below the upper tie bars 120a, 120c. The linear slide 146 may be positioned at an elevation below a lowermost extent of the platens, and/or below the lower tie bars 120b, 120d.

The linear slide 146 may comprise at least a first rail 146a fixed to the machine base 112. The first rail 146a may extend parallel to the machine axis 119, and the upright 134 may be selectively displaceable along the first rail 146a in a direction parallel to the machine axis 119. The machine base 112 may include a generally planar sidewall 150, and the first rail 146a may be fixed to the sidewall 150.

The linear slide 146 may comprise a second rail 146b fixed to the machine base 112 and oriented parallel to the first rail 146a. In the example illustrated, the second rail 146b is mounted to the sidewall 150 of the machine base 150 at a position spaced vertically apart from (and below, in the example illustrated) the first rail by a vertical rail offset 152.

The carriage 148 may comprise at least a first bearing block 154a slidably coupled to the first rail 146a. In the example illustrated, the carriage 148 comprises a first bearing block 154a slidably coupled to the first rail 146a and a second bearing block 154b slidably coupled to the second rail 146b. The carriage 148 may further comprise a strut member 156 (largely obscured in FIG. 2 by a portion of the lower end 134a of the upright 134), the strut member 156 (also called a carriage body) fixing together the first and second bearing blocks 154a, 154b.

In some examples, the structural integration of the static mount portion 142 with the machine base 112 may comprise configuring the adjustable mount 140 such that the connection between the machine base 112 and the static mount portion (i.e. the rails 146a, 146b in the example illustrated) may be generally free of any arms or standoffs spacing apart the rail 146a, 146b from the machine base 112. This can, for example, facilitate a reduction or elimination of any undesired deflection or displacement of the static mount portion 142 resulting from, for example, any moment load exerted at the connection between the static mount portion 142 and the base 112 as a result of the weight or inertial forces of the part handling apparatus 130.

The part handling apparatus 130 may include a first linear actuator 160 to facilitate adjusting the position of the upright 134 relative to the machine base 112. In the example illustrated, the first linear actuator 160 comprises a first ball nut 162 fixed to the strut member (carriage body) 156 of the carriage 148, and a first ball screw 164 rotatably coupled to the ball nut 162 and driven by a first servo motor 166. Selectively driving the first servo motor 166 in one direction or the other effects a corresponding translation of the upright 134 along the linear slide 146 in one direction or the other. A holding torque can be applied to the first servo motor 166 to facilitate releasably locking the upright 134 in a desired position along the linear slide 146. The first servo motor 166 can be mounted to the sidewall 150, and can be positioned at an elevation between the first and second rails 146a, 146b.

Figure 3:
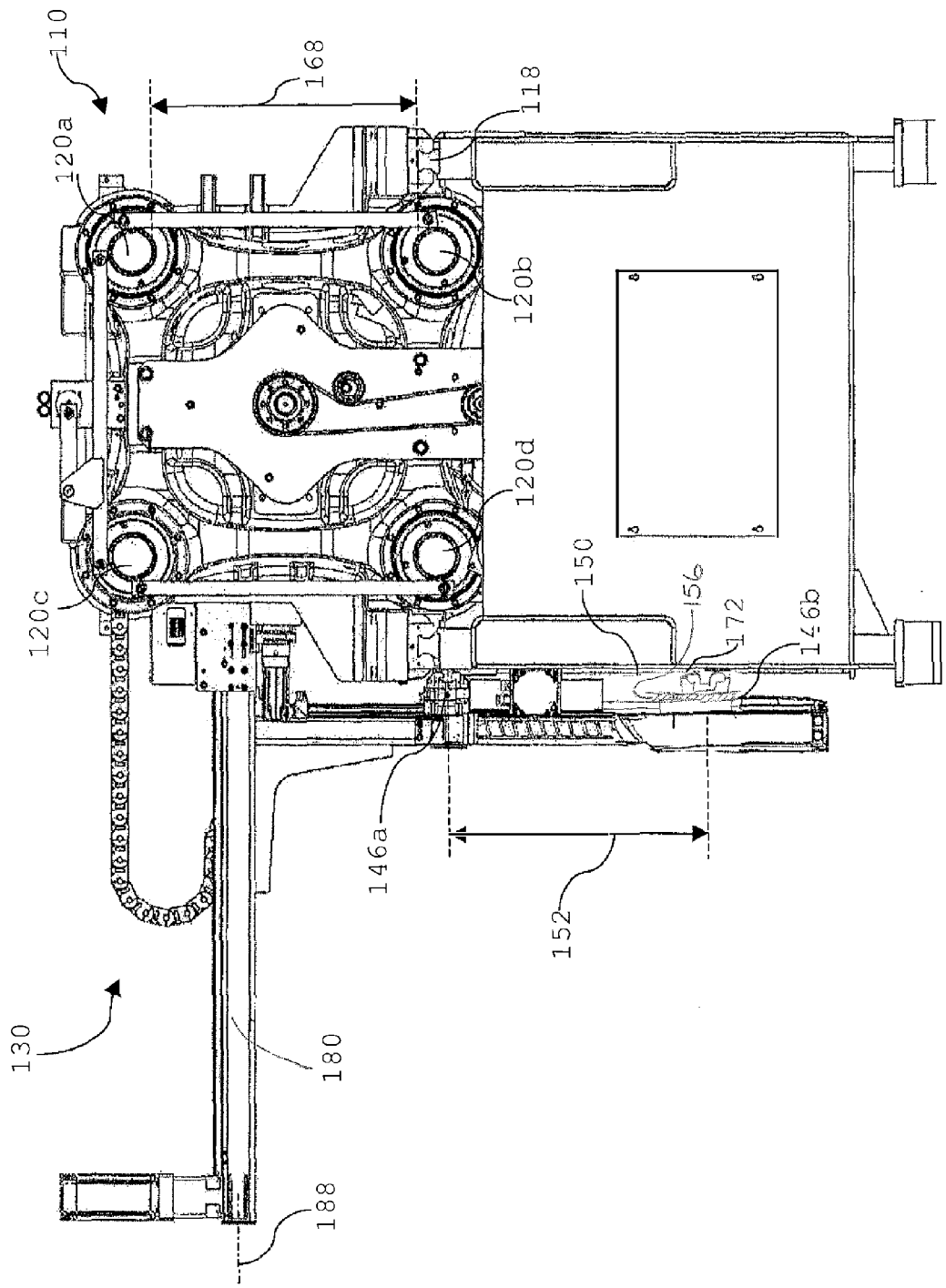
FIG. 3 is an end view of the structure of FIG. 1.

With reference also to FIG. 3, in the example illustrated, the part handling apparatus 130 is generally configured as a linear (or cartesian) robot, that is, in the example illustrated, mounted in a side entry configuration in which the EOAT 132 generally accesses the space between the platens 114, 116 (when in the open position) by reaching between the upper back and lower back tie bars 120c, 120d. The upper and lower tie bars 120c, 120d may be spaced vertically apart by a vertical tie bar spacing 168, and the vertical rail offset 152 may be at least about 25 percent of the vertical tie bar spacing 168. In the example illustrated, the vertical rail offset 152 is at least about 75 percent of the vertical tie bar spacing 168.

The first rail 146a may be positioned at an elevation greater than the second rail 146b and generally equal to or less than the lower back tie bar 120d. In the example illustrated, the first rail 146a is positioned at an elevation above the second rail 146b and at approximately the same elevation as the lower back tie bar 120d. The first rail 146a and the second rail 146b are, in the example illustrated, generally positioned in a common vertical plane. In other examples, the first and second rails may be laterally offset relative to each other, for example, the first rail 146a may be positioned nearer to the operator side of the machine than the second rail 146b.

The first and second rails 146a, 146b may be disposed laterally intermediate the upright 134 and the machine base 112. In the example illustrated, the machine base 112 comprises the back sidewall 150 disposed in a generally vertical plane at a non-operator side of the machine, and the upright 134 comprises a proximal surface 172 facing the back sidewall 150. At least one of the first and second rails 146a, 146b may be disposed laterally between (i.e. in a horizontal front-to-back direction) the proximal surface 172 and the back sidewall 150.

Figure 2:
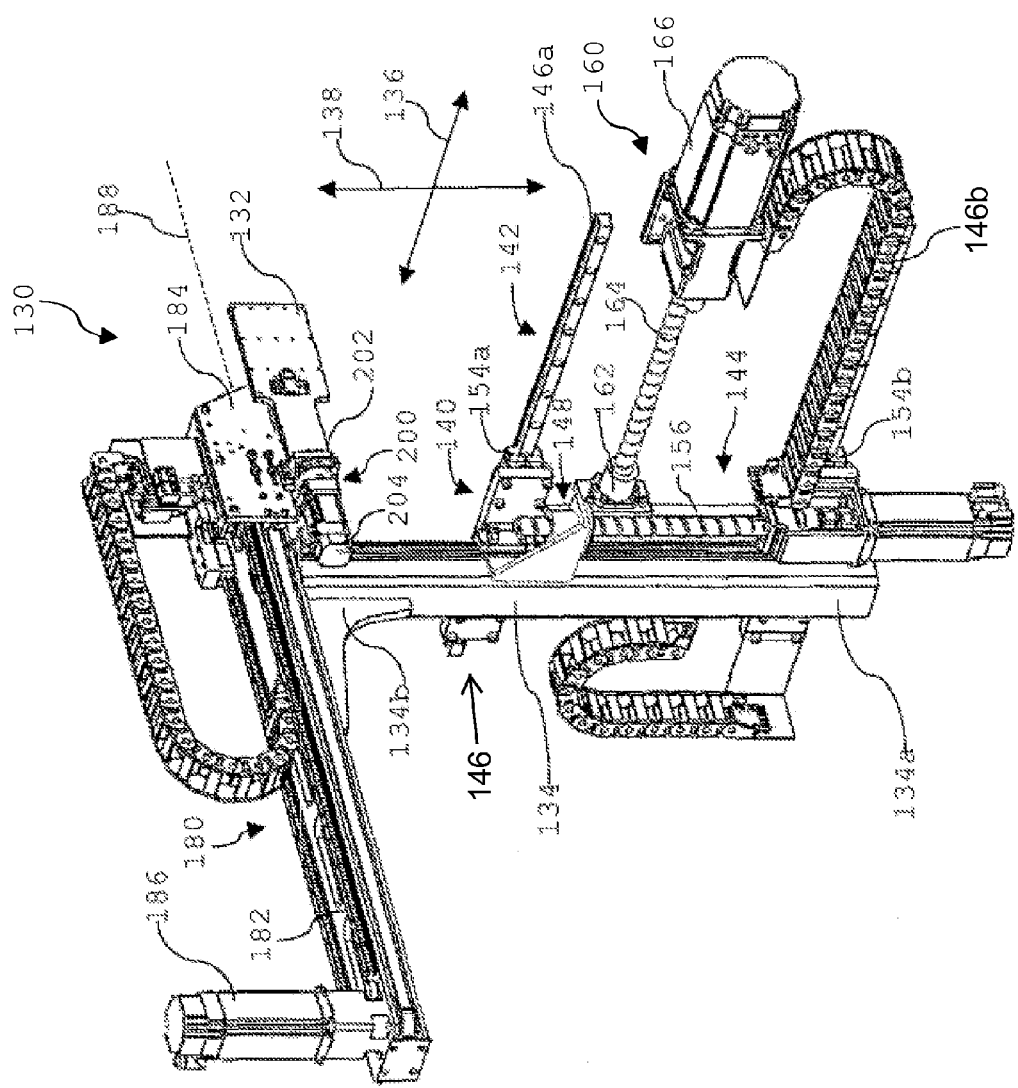
FIG. 2 is an enlarged perspective view of the part handling apparatus of FIG. 1.
Figure 4:
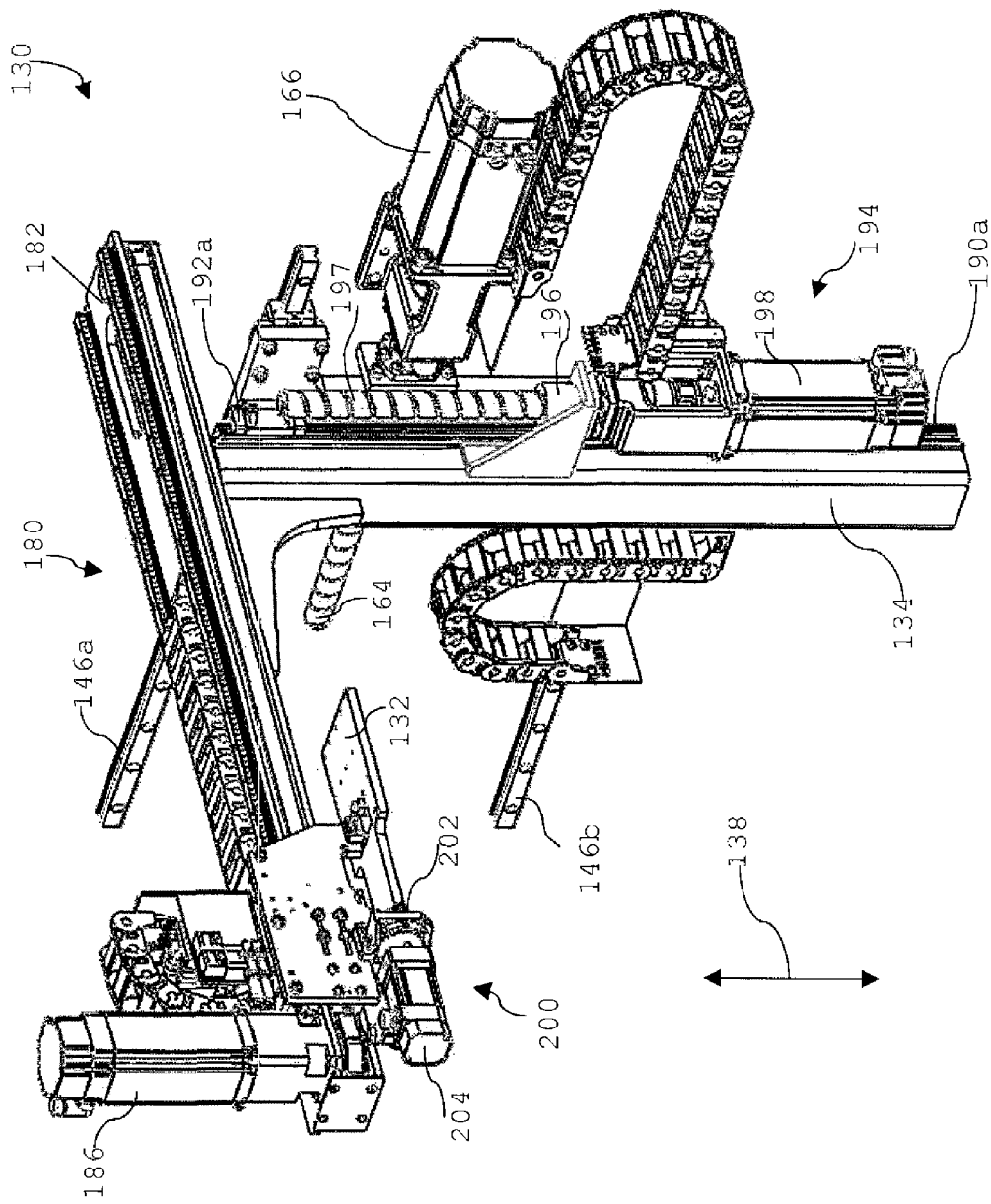
FIG. 4 is a perspective view of the part handling apparatus of FIG. 2 showing various moving elements in different positions than in FIG. 2.

With reference to FIGS. 2 and 4, the part handling apparatus 130 may include a manipulator 180 supported by the upright 134, and the EOAT 132 may be coupled to the upright 134 via the manipulator 180. The manipulator 180 may comprise a static arm portion 182 and a dynamic manipulator portion 184. The static arm portion 182 may be fixed to the upper end 134b of the upright 134. The dynamic manipulator portion 184 may be slidably coupled to the static arm portion 182, and may be movable relative to the static arm portion 182 for moving the EOAT 132 between advanced and retracted positions. In the example illustrated, when in the advanced position, the EOAT reaches between the platens (FIGS. 1 and 2). When in the retracted position, the EOAT is clear of the platens (FIG. 4). Movement of the dynamic manipulator portion 184 relative to the static arm portion 182 may be effected by a manipulator actuator driven by a manipulator servo motor 186.

In the example illustrated, the dynamic manipulator portion 184 is moveable relative to the static arm portion 182 along a generally linear arm axis 188 extending between the advanced and retracted positions. The arm axis 188 is, in the example illustrated, generally horizontal, and oriented generally perpendicular to the machine axis 119.

With reference to FIG. 4, and as mentioned previously, in the example illustrated the position of the upright 134 is adjustable relative to the machine base 112 in an optional generally vertical second linear adjustment direction 138 in addition to the first, generally horizontal linear adjustment direction 136. The adjustable mount may comprise a second linear slide having at least one second direction rail 190a oriented parallel to the second adjustment direction 138 (i.e. generally vertically, in the example illustrated) and fixed to one of the carriage 148 and the upright 134. At least one second direction bearing block 192a may be fixed to the other one of the upright 134 or carriage 148, and be slidably coupled with the second direction rail 190a to facilitate displacing the upright 134 relative to the machine base 112 in the second adjustment direction 138. In the example illustrated, the at least on second direction rail 190 is fixed to the upright, and the at least one second direction bearing block 192a is fixed to the carriage body 156 of the carriage 148.

The part handling apparatus 130 may include a second direction linear actuator 194 to facilitate moving the upright 134 in the second adjustment direction 138. The second direction linear actuator 194 may comprise a second ball nut 196 fixed to the upright 134, and a second ball screw 197 rotatably mounted to the carriage 148 and driven by a second servo motor 198, the ball nut 196 engaged with the ball screw 197. Selectively driving the second servo motor 198 in one direction or the other effects a corresponding translation of the upright 134 up or down along the second linear adjustment direction 138.

Referring again to FIGS. 2 and 4, the part handling apparatus may include an optional rotary actuator 200 mounted to the dynamic manipulator portion 184 of the manipulator 180. The EOAT 132 may be mounted to the dynamic manipulator portion 184 via the rotary actuator 200. The rotary actuator 200 may include a rotary base plate 202 that is rotated about a desired range of motion (for example, 90 degrees) under the influence of a C-axis servo motor 204. The EOAT 132 may be mounted to the rotary base plate 202, and pivoted between a first vertical position (e.g. platen transfer position) shown in FIG. 2, and a second horizontal position (e.g. a discharge position) shown in FIG. 4.

Figure 5:
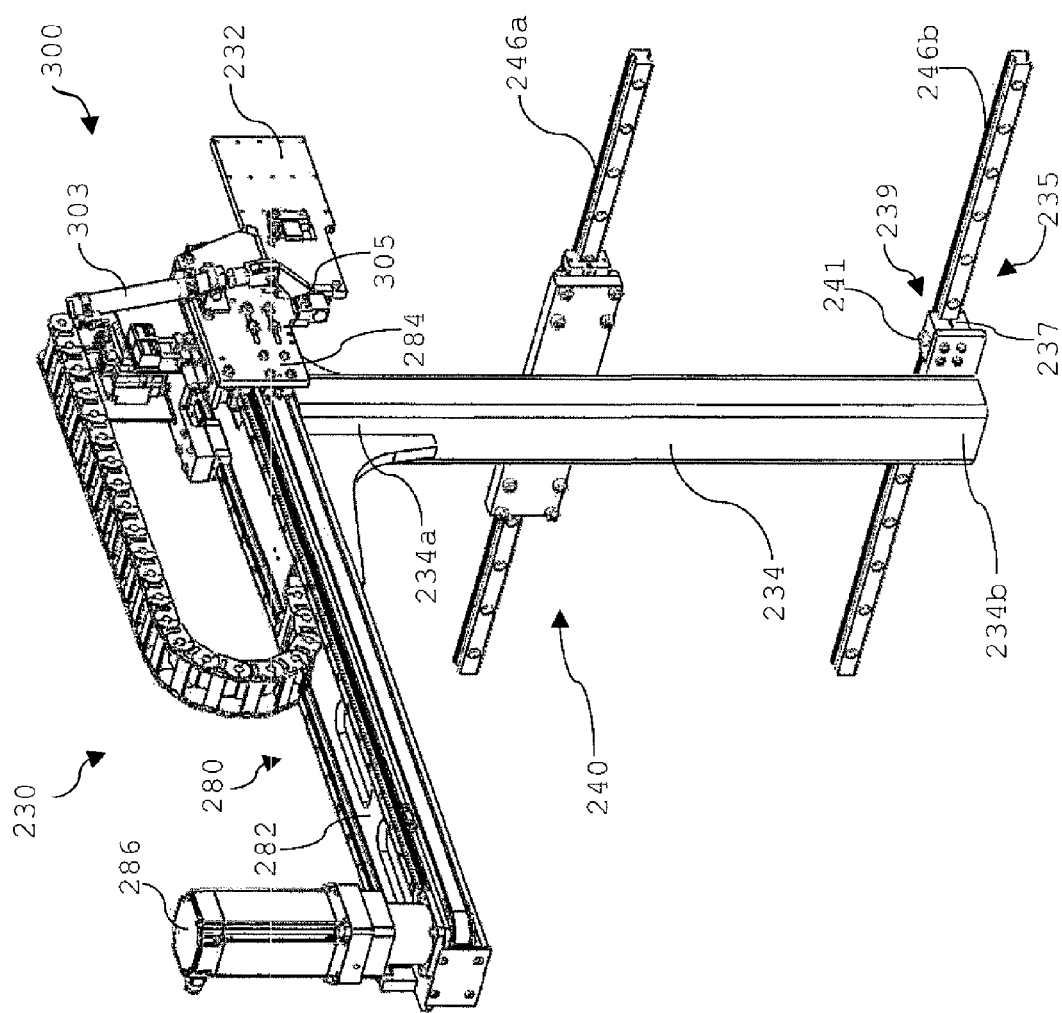
FIG. 5 is a perspective view of another example of a part handling apparatus.

Referring to FIG. 5, another example of a part handling apparatus 230 is similar to the apparatus 130, and like features are identified by like reference characters, incremented by 100. The part handling apparatus 230 comprises a first rail 246a and a second rail 246b of a linear slide of an adjustable mount 240 for mounting the part handling apparatus 230 to an injection molding machine 110 having a machine axis 119. The first and second rails 246a, 246b are oriented parallel to the machine axis 119. The apparatus 230 is free of a first actuator for moving the upright 234 relative to the machine base 112 along the rails 246a, 246b. Rather, in the example illustrated, the upright 234 can be moved manually, for example, by hand, along the rails 246a, 246b. When in a desired position, the upright can be releasably locked relative to the rails 246a, 246b by, for example, moving a locking member from an unlocked position to a locked position. In the example illustrated, a locking member 235 is fixed to the lower end 234b of the upright 234. The locking member 235 comprises a split block 237 having a groove 239 for receiving the rail 246b therethrough in sliding fit when in the unlocked position. The locking member 235 may further include a bolt 241 that when tightened, squeezes the split block 237 against the rail 246b so that the force of friction locks the locking member 235 to the rail 246b.

The part handling apparatus 230 also comprises a rotary actuator 300 mounted to the dynamic arm portion 284 of the manipulator arm 280. Rather than using a servo motor, the rotary actuator 300 is moved between rotationally advanced and retracted positions (e.g. vertical and horizontal positions) by a pneumatic linear actuator 303 connected to the EOAT 232 (or an underlying pivot plate, if desired) at a pivot joint 305.

Figure 6:
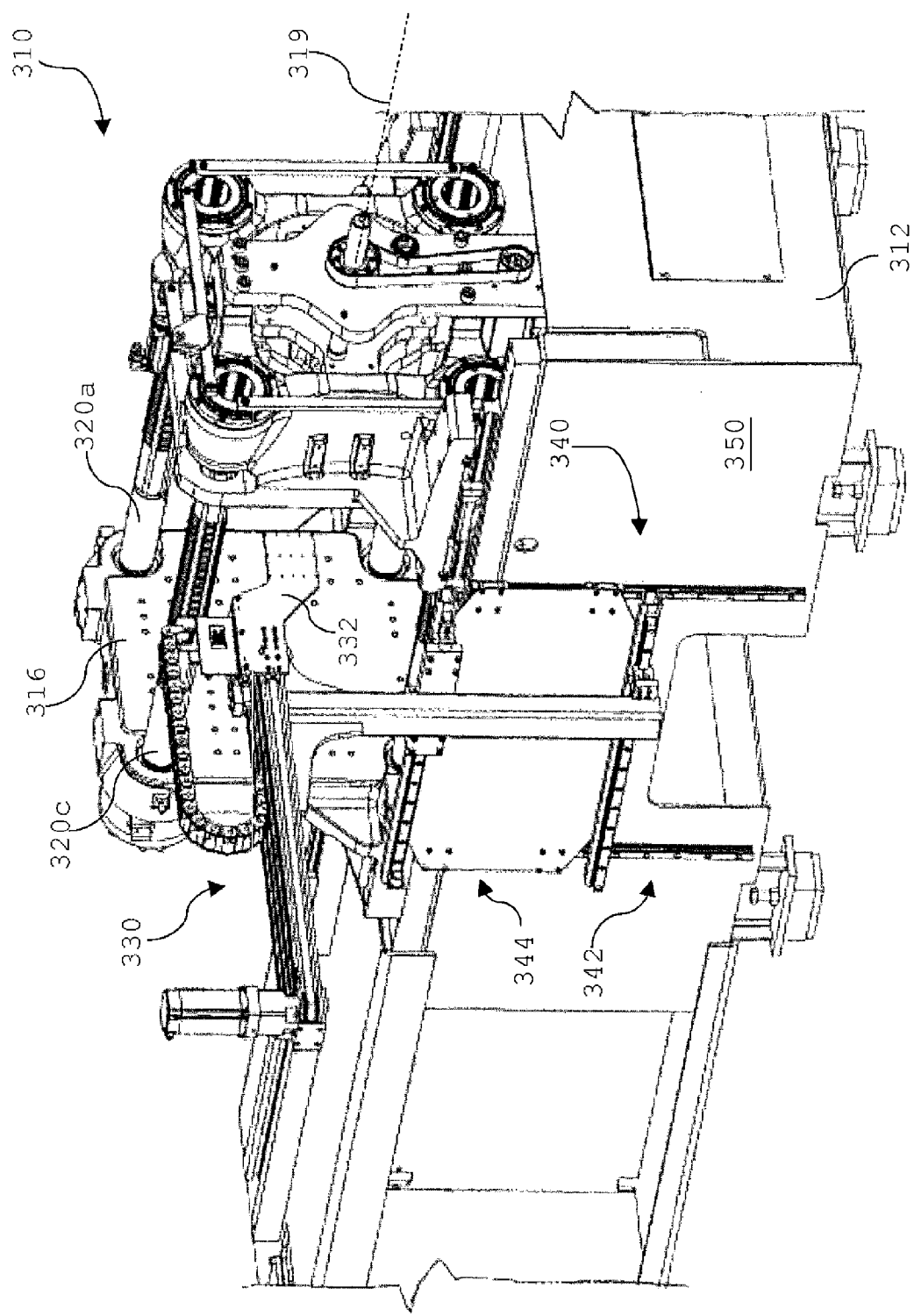
FIG. 6 is a perspective view of another example of an injection molding machine with a part handling apparatus.

Referring to FIG. 6, another example of an injection molding machine 310 is illustrated. The injection molding machine 310 is similar to the injection molding machine 110, and like features are identified by like reference characters, incremented by 200.

The injection molding machine 310 comprises a machine base 312 and a part handling apparatus 330 for manipulating parts associated with molded part production. The part handling apparatus 330 generally comprises an EOAT 332 movable between an advanced and a retracted position for interacting with the parts. In the example illustrated, when in the advanced position, the EOAT reaches between the platens 314, 316 to insert articles into, and/or retract articles from, the mold when the mold is open (i.e. when the moving platen is in the open position). When in the retracted position, the EOAT is clear of the platens 314, 316 so as to avoid interference with the mold when moving to the closed position.

Figure 7:
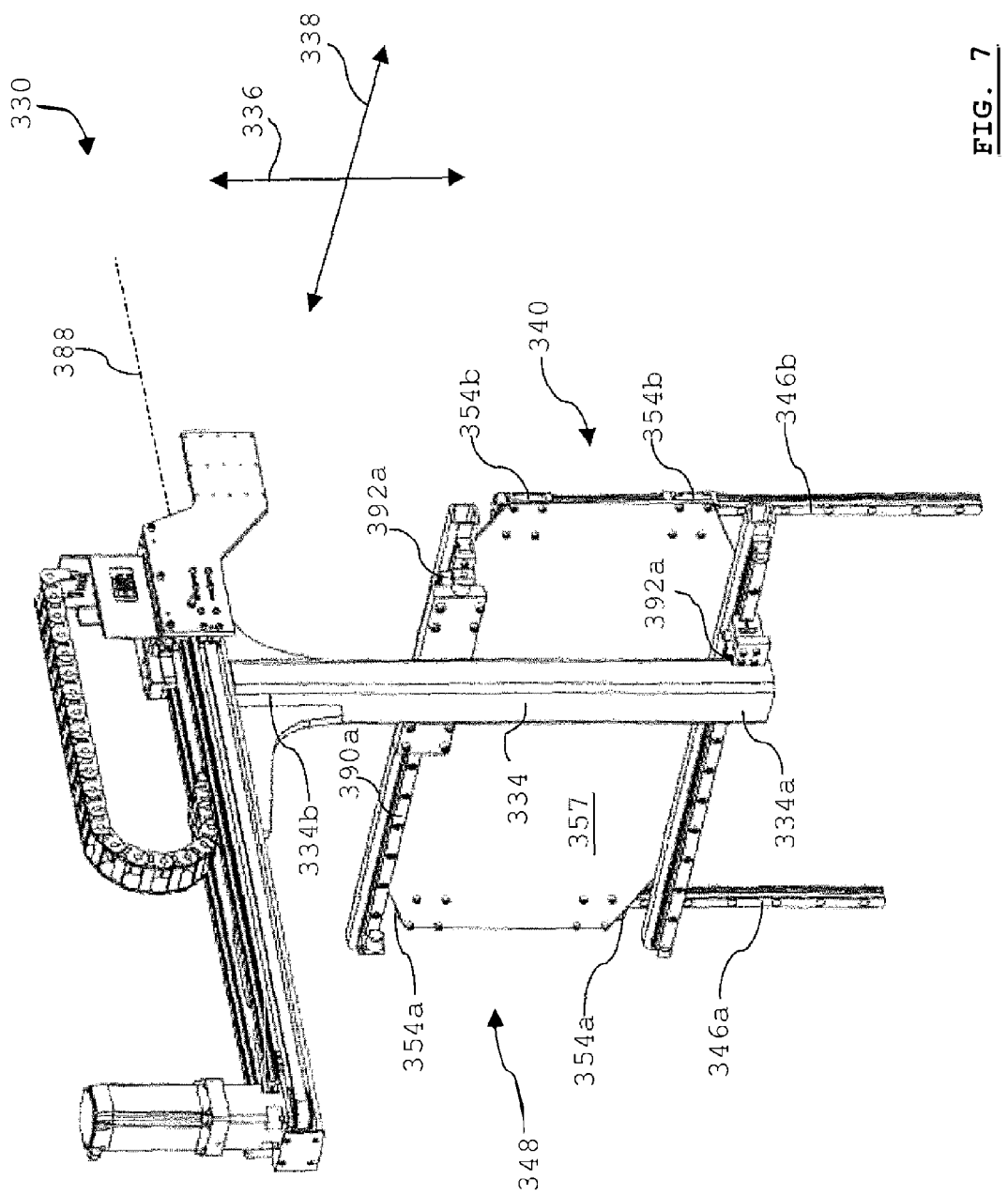
FIG. 7 is an enlarged perspective view of the part handling apparatus of FIG. 6.

With reference also to FIG. 7, the part handling apparatus 330 may include an upright 334 having a lower end 334a adjustably coupled to the machine base 312 and an upper end 334b spaced apart from the lower end 334a and coupled to the EOAT 132. The position of the upright 334 relative to the base 312 may be adjustable in at least one of a first and second linear adjustment direction 336, 338. In the example illustrated, the position of the upright 334 relative to the machine base 312 is adjustable in a first linear adjustment direction 336 that is generally vertical, and in an optional second linear adjustment direction 338 that is generally horizontal and generally parallel to the machine axis 319.

The part handling apparatus 330 may include an adjustable mount 340 for securing the upright 334 to the machine base 112. The adjustable mount 340 may include a static mount portion 342 structurally integrated with the machine base 112, and a dynamic mount portion 344 fixed to the upright 334 and coupled to the static mount portion 342. The position of the dynamic mount portion 344 relative to the static mount portion 342 may be adjustable.

In the example illustrated, the static mount portion 342 comprises a linear slide 346, and the dynamic mount portion 344 comprises a carriage 348 slidably coupled to the linear slide 346. The linear slide 346 may comprise at least a first rail 346a fixed to the machine base 312. The first rail 346a may extend generally vertically, and the upright 334 may be selectively displaceable along the first rail 346a in a vertical direction. The machine base 312 may include a generally planar sidewall 350, and the first rail 346a may be fixed to the sidewall 350. In the example illustrated, the linear slide comprises a second rail 346b fixed to the machine base 312 and oriented parallel to the first rail 346a. In the example illustrated, the second rail 146b is mounted to the sidewall 150 of the machine base 150 at a position spaced horizontally apart from (parallel to the axis 319) and at approximately the same elevation as, the first rail 346b.

The carriage 348 may comprise at least a first bearing block 354a slidably coupled to the first rail 346a. In the example illustrated, the carriage 348 comprises a pair of first bearing blocks 354a slidably coupled to the first rail 346a and a pair of second bearing block 354b slidably coupled to the second rail 346b. The carriage 348 may further comprise a support plate 357 generally extending in width between the two rails 346a, 346b, with the bearing blocks 354a, 354b fixed to the support plate 357. The upright 334 may be mounted to the support plate 357, so that the upright 334 moves vertically up and down with the support plate by sliding engagement of the bearing blocks 354 with the respective rails 346.

In the example illustrated the position of the upright 334 is adjustable relative to the machine base 312 in an optional generally horizontal second linear adjustment direction 338 in addition to the first, generally vertical linear adjustment direction 336. The adjustable mount 340 may comprise a second linear slide having at least one second direction rail 190a fixed to the carriage 148 and oriented parallel to the second adjustment direction 138 (i.e. generally horizontally, in the example illustrated). At least one second direction bearing block 192a may be fixed to the upright 134 and slidably coupled with the second direction rail 190a to facilitate displacing the upright 134 relative to the machine base 112 in the second adjustment direction 138. In the example illustrated, the adjustable mount 340 comprises two second direction rails 390a spaced vertically apart from each other, and fixed to the support plate 357. At least one second direction bearing block 392a is, in the example illustrated, slidably coupled to each rail 390a. The upright 334 may be fixed to the second direction bearing blocks 392a, facilitating adjustment of the upright 334 relative to the base 312 in the second, generally horizontal adjustment direction.

Figure 8:
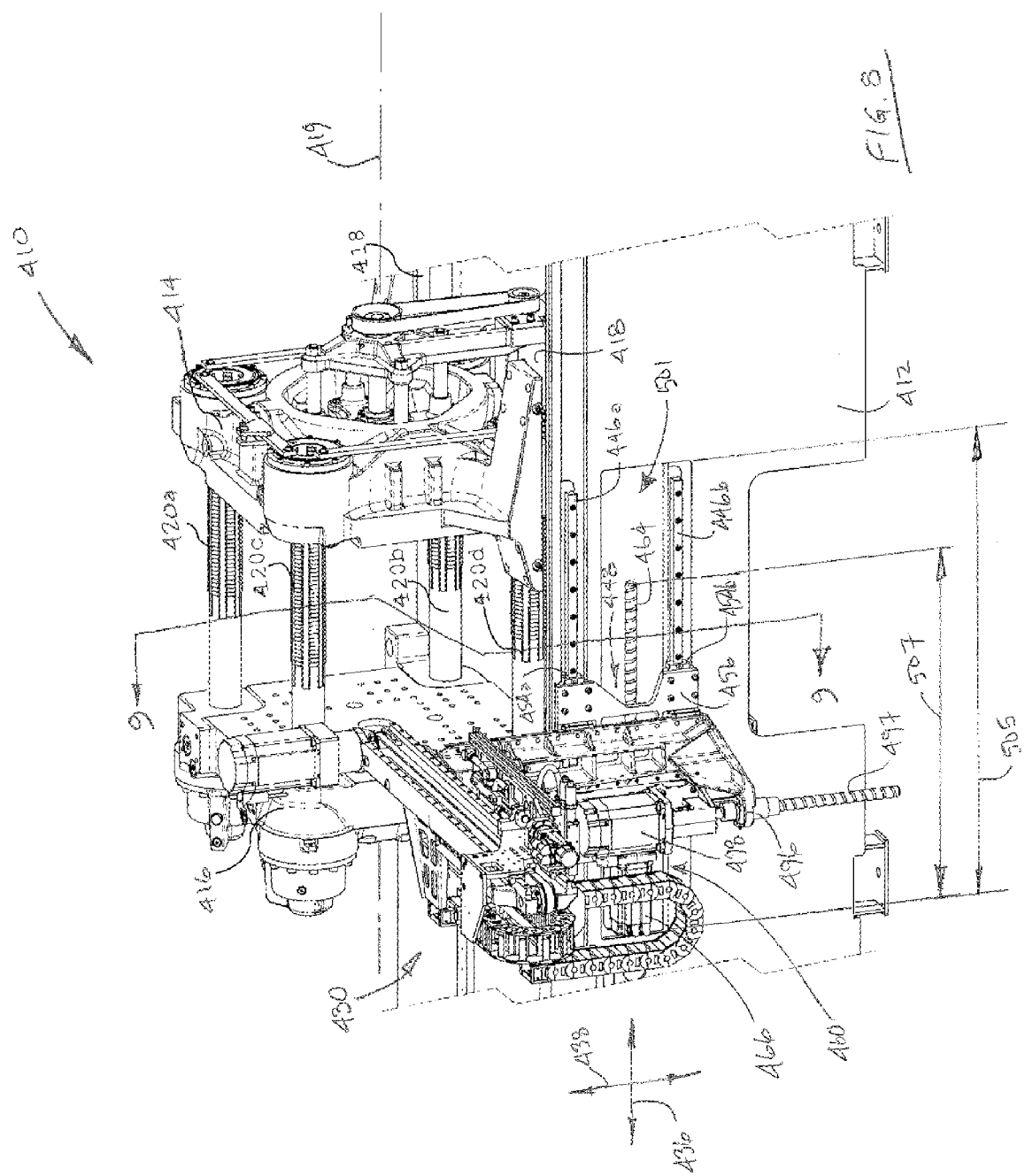
FIG. 8 is a perspective view of a portion of another example of an injection molding machine with a part handling apparatus.
Figure 9:
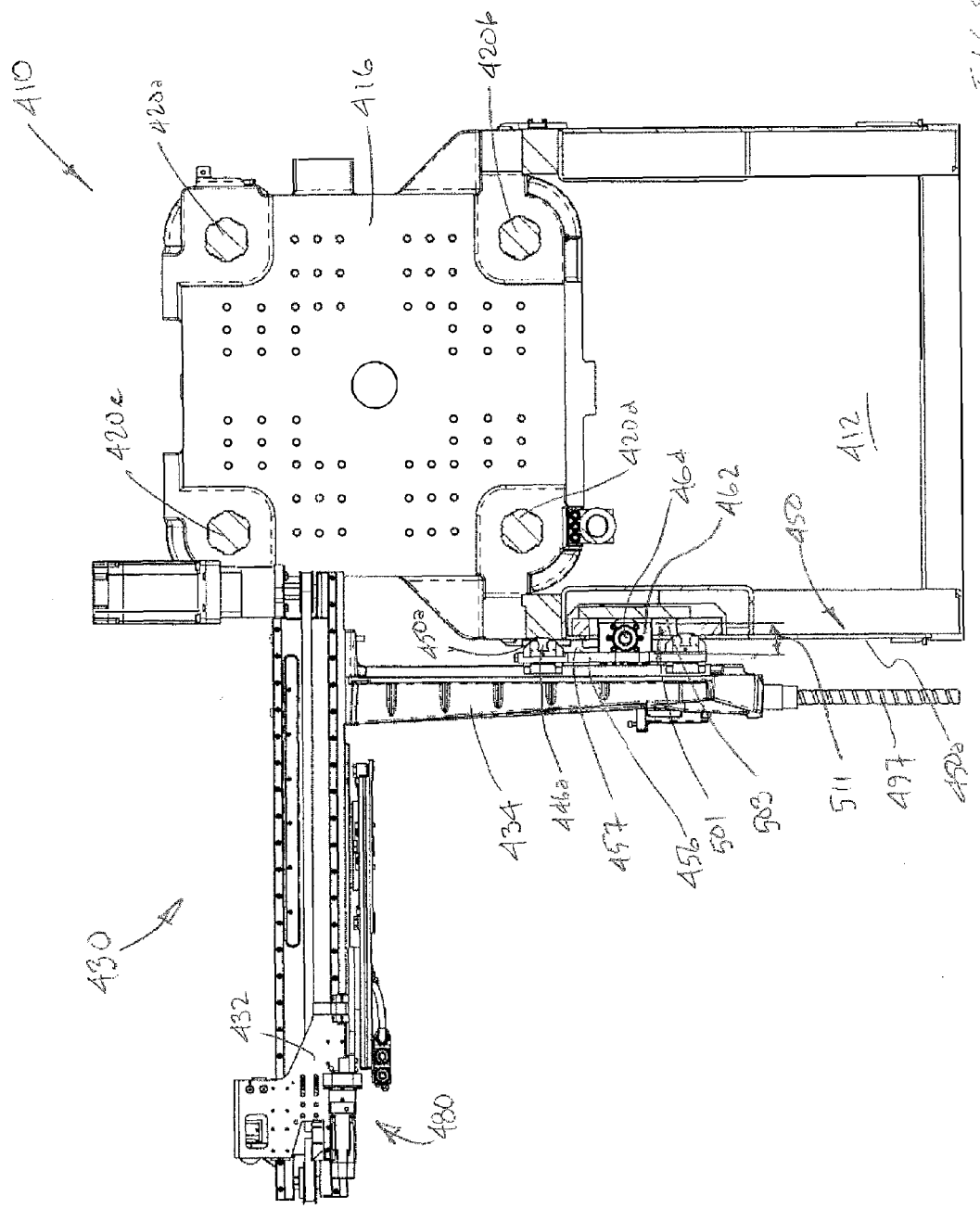
FIG. 9 is a sectional view of the structure of FIG. 8, taken along the lines 9-9.

Referring to FIGS. 8 and 9, another example of an injection molding machine 410 is provided with a part handling apparatus in the form of a side entry robot. The machine 410 has similarities to the machine 110, and like features are identified by like reference characters, incremented by 300.

The machine 410 includes a base 412 and a pair of platens 414, 416 supported on the base 412. At least one of the platens 414, 416 is slidable along a machine axis 419 between mold open and mold closed positions. In the example illustrated, the first platen 414 is translatable along the base 412 between mold open and mold closed positions.

The part handling apparatus 430 includes a manipulator 480 moveable horizontally between an advanced position and a retracted position. The manipulator 480 is configured to reach between the platens when the platens are in the mold open position and the manipulator is in the advanced position. The manipulator is configured to be clear of the platens when the manipulator is in the retracted position, so that the first platen 414 can move between mold open and mold closed positions without interference with the manipulator.

The part handling apparatus 430 includes a first linear support coupled to the base 412, and an upright 434 supporting the manipulator above the base 412. The upright 4112 has a lower end mounted to the base.

The base has a sidewall 450 with an outer sidewall surface 450a, and the first linear support includes at least one rail 446 mounted to the outer sidewall surface 450a.

The part handling apparatus 430 further includes a first actuator 460 for moving the upright 434 along the first linear support. The first actuator includes a ball screw 464 attached to the base 412 and a rotary drive for rotating the ball screw.

In the example illustrated, the sidewall 450 has at least one recess 501 extending laterally inwardly of the outer surface 450a, at least a portion of the first actuator 460 disposed within the recess 501. The recess 501 has a back wall 503 generally parallel to the outer surface 450a of the sidewall 450 and spaced laterally inwardly therefrom. The rotary drive may comprise a motor 466 mounted to the back wall 503 of the recess 501.

In the example illustrated, the recess 501 has a recess axial extent 505 parallel to the machine axis 419 and the ball screw 464 has a ball screw length that is less than recess axial extent 505.

In the example illustrated, the motor 466 is in-line with the ball screw 464, the motor 464 having an axial length that together with the ball screw length defines an actuator axial extent 507. The recess axial extent 505 is greater than the actuator axial extent 507.

The part handling apparatus 430 may further include a carriage. The carriage may provide certain benefits to the apparatus, 430, including, for example, ease of assembly and/or replacement of components, and/or facilitating provision for both Y-axis motion and X-axis motion of the manipulator 480 relative to the machine base 412.

In the example illustrated, the apparatus 430 includes a carriage 448 having a carriage body 456, and at least one bearing block 454 is fixed to the carriage body 456. The bearing block 454 is slidably engaged with the rail 446, and the upright 434 is coupled to the carriage body 456. The carriage body has a proximal surface 457 facing the recess 501 and the actuator 460 includes a ball nut 462 engaged with the ball screw and fixed to the proximal surface 457 of carriage body 456, the ball nut 462 protruding at least partially into the recess 501. The ball nut 462 has a lateral ball nut width 511, and at least about half the ball nut width 511 extends into the recess 501.

While the above description provides examples of one or more processes or apparatuses, it will be appreciated that other processes or apparatuses may be within the scope of the accompanying claims.

The invention claimed is:

1. A method of handling molded articles produced by an injection molding machine, comprising:
   a) supporting an upright along a linear rail, the linear rail oriented horizontally and parallel to a machine axis of an injection molding machine and structurally integrated with a base of the injection molding machine, the upright fixed in a vertical orientation perpendicular to the machine axis;
   b) supporting an extensible arm on the upright and supporting an end-of-arm-tooling on the extensible arm, the end-of-arm-tooling movable between a retracted position and an advanced position by actuation of the extensible arm, along an arm axis perpendicular to the machine axis; and
   c) moving the end-of-arm-tooling from the retracted position to the advanced position for receiving molded articles in the end-of-arm-tooling from a mold portion of the injection molding machine.

2. The method of claim 1, further comprising moving the end-of-arm-tooling to the retracted position after receiving the molded articles from the mold portion.

3. The method of claim 2 further comprising transferring the molded articles from the end-of-arm-tooling to a post-mold cooling station.

4. The method of claim 1, wherein the end-of-arm-tooling is spaced apart from the upright along the arm axis toward the injection molding machine when in the advanced position, and is spaced apart from the upright along the arm axis away from the injection molding machine when in the retracted position.

5. The method of claim 1, wherein the end-of-arm-tooling reaches between two platens supported on the base of the injection molding machine when in the advanced position, and is clear of the two platens when in the retracted position.

6. A method of handling molded articles produced by an injection molding machine, comprising:
   a) movably supporting an upright along a linear rail, the upright oriented vertically, the linear rail oriented horizontally and parallel to a machine axis of an injection molding machine, and the linear rail structurally integrated with, and fixed relative to, a base of the injection molding machine;
   b) supporting an extensible arm on the upright and supporting an end-of-arm-tooling on the extensible arm, the end-of-arm-tooling movable relative to the upright along an arm axis perpendicular to the machine axis, between retracted and advanced positions by actuation of the extensible arm;
   c) moving the end-of-arm-tooling from the retracted position to the advanced position for receiving molded articles from a mold portion of the injection molding machine; and
   d) after step c), moving the end-of-arm-tooling to the retracted position.

7. The method of claim 6, wherein the mold portion is mounted to one of a fixed platen and a stationary platen disposed atop the machine base, and wherein step c) includes moving the end-of-arm-tooling between an upper tie bar and a lower tie bar, the upper and lower tie bars extending horizontally between the moving platen and the stationary platen and spaced vertically apart by a vertical tie bar spacing.

8. The method of claim 7, further comprising transferring the molded articles from the end-of-arm-tooling to a post-mold cooling station.

9. The method of claim 6, wherein the end-of-arm-tooling is spaced apart from the upright along the arm axis toward the injection molding machine when in the advanced position, and is spaced apart from the upright along the arm axis away from the injection molding machine when in the retracted position.

10. The method of claim 6, wherein the end-of-arm-tooling reaches between two platens supported on the base of the injection molding machine when in the advanced position, and is clear of the two platens when in the retracted position.

11. A method of handling molded articles produced by an injection molding machine, comprising:
   a) movably supporting an upright along a linear rail, the upright oriented vertically, the linear rail oriented horizontally and parallel to a machine axis of an injection molding machine, and the linear rail structurally integrated with, and fixed relative to, a base of the injection molding machine;
   b) supporting an extensible arm on the upright and supporting a receiver plate on the extensible arm, the receiver plate movable relative to the upright along an arm axis perpendicular to the machine axis, between retracted and advanced positions by actuation of the extensible arm;
   c) while the receiver plate is in the retracted position, positioning the upright along the linear rail to a first position;
   d) after step c), moving the receiver plate from the retracted position to the advanced position for receiving molded articles from a first tooling plate of the injection molding machine; and
   e) after step d), moving the receiver plate to the retracted position, wherein step a) comprises slidably coupling a carriage to the linear rail, the upright fixed in a vertical orientation to the carriage.

* * * * *